(12) United States Patent
Lee et al.

(10) Patent No.: US 7,943,544 B2
(45) Date of Patent: May 17, 2011

(54) METHOD OF RECYCLING SPENT FLUE GAS DENITRATION CATALYST

(75) Inventors: In-Young Lee, Daejeon (KR); Jung-Bin Lee, Daejeon (KR); Dong-Wha Kim, Daejeon (KR)

(73) Assignee: Korea Electric Power Corporation, Seoul (KR)

( * ) Notice: Subject to any disclaimer, the term of this patent is extended or adjusted under 35 U.S.C. 154(b) by 691 days.

(21) Appl. No.: 12/007,746

(22) Filed: Jan. 15, 2008

(65) Prior Publication Data

US 2009/0005235 A1    Jan. 1, 2009

(30) Foreign Application Priority Data

Jun. 26, 2007   (KR) ........................ 10-2007-0063237

(51) Int. Cl.
*B01J 38/02*    (2006.01)
(52) U.S. Cl. ............................ 502/56; 502/514; 502/515
(58) Field of Classification Search .................... 502/56, 502/514, 515
See application file for complete search history.

(56) References Cited

U.S. PATENT DOCUMENTS

| 3,634,497 A | * | 1/1972 | Budke ........................... 560/245 |
| 4,678,557 A | * | 7/1987 | Rodriguez et al. ............ 208/112 |
| 6,387,836 B1 | | 5/2002 | Dörr et al. |

FOREIGN PATENT DOCUMENTS

KR    10-2006-0076297    7/2006

* cited by examiner

*Primary Examiner* — Edward M Johnson
(74) *Attorney, Agent, or Firm* — The Nath Law Group; Jerald L. Meyer; Sungyeop Chung

(57) ABSTRACT

The present invention provides a method of recycling a spent flue gas denitration catalyst and a method of determining a washing time of the spent flue gas denitration catalyst. The method of recycling the spent flue gas denitration catalyst includes physically removing solids deposited in the spent flue gas denitration catalyst, removing poisoning substances deposited in the spent flue gas denitration catalyst by washing the spent flue gas denitration catalyst with a washing liquid for a washing time determined by measuring the hydrogen ion concentration of the washing liquid and drying the resulting spent flue gas denitration catalyst.

10 Claims, 4 Drawing Sheets

METHOD OF RECYCLING SPENT FLUE GAS DENITRATION CATALYST

RELATED APPLICATIONS

This application claims priority and is an accurate translation of Korean Patent Application No. 10-2007-0063237, filed Jun. 26, 2007, the entire disclosure of which is incorporated herein by reference.

BACKGROUND

1. Field of the Invention

This invention relates to a method of recycling a spent flue gas denitration (de-NOx) catalyst and a method of determining a washing time of the spent flue gas denitration catalyst and, more particularly, to a method of recycling a spent flue gas denitration catalyst, of which activity has been lowered, using a washing liquid in a selective catalytic reduction (SCR) process for removing nitrogen oxides (NOx) contained in flue gas, and a method of determining a washing time using the washing liquid.

2. Related Art

A method of removing nitrogen oxides that is most widely used in thermal power stations, incinerators, industrial boilers, etc. is a selective catalytic reduction (SCR) technique, in which the nitrogen oxides react to ammonia used as a reducing agent under the presence of a catalyst to be decomposed into harmless nitrogen and water. The commercially available catalyst (SCR catalyst) is composed of a titanium dioxide ($TiO_2$) carrier, vanadium (1 to 3%) and tungsten (10 to 20%) as active materials, and organic and inorganic binders for extrusion molding.

The activity of the flue gas denitration catalyst is degraded continuously with the passage of operation time due to poisoning by alkali metals, alkali earth metals and heavy metals contained in fly ash and due to deposition of solids, and thus its life span comes to an end after a predetermined period of time (about 2 to 5 years). Accordingly, extensive research aimed at recycling the spent flue gas denitration catalyst as well as at developing the flue gas denitration catalyst has continued to progress.

Korean Patent Application No. 2002-0071244 discloses a method of recycling a spent catalyst, in which the surface of the spent catalyst is washed with an alkali solution, polished with a polishing agent, washed repeatedly with an alkali solution such as NaOH, KOH and $NH_3$ for 5 to 10 minutes, and finally washed with water. However, the above patent application does not disclose any method of calculating a washing time.

U.S. Pat. No. 4,615,991 discloses a method of washing and recovering a spent flue gas denitration catalyst, in which the spent flue gas denitration catalyst is washed with an aqueous oxalic acid solution and impregnated with a tungsten (W) compound. Here, the washing time is determined by the temperature of the washing liquid and a chemical quantitative analysis of the washing liquid and poisoning substances.

Especially, Raziyeh Kodayari et al. have proposed a method of recycling a spent flue gas denitration catalyst using $H_2SO_4$, $VOSO_4$ and $(NH_4)WO_4$ solutions and a method of measuring poisoning substances contained in a washing liquid using a potassium electrode in Applied Catalysis B: Environmental 30 (2001), pp. 87-99.

As above, the conventional methods for calculating an optimal washing time analyze the poisoning substances contained in the washing liquid quantitatively using an analyzer such as an inductively coupled plasma atomic emission spectrometer; however, the convention methods using such analysis equipment have some drawbacks in that they requires a considerable amount of manpower and equipment and it takes a lot of time to carry out the analysis.

BRIEF SUMMARY

In accordance with the exemplary embodiments disclosed herein, the present invention provides a method of determining a washing time of a spent flue gas denitration catalyst, which can determine an optimal washing time with less manpower and time without expensive equipment while washing the spent flue gas denitration catalyst, and a method of recycling the flue gas denitration (de-NOx) catalyst at low cost and high efficiency using the above method of determining the washing time.

In one exemplary embodiment, there is provided a method of recycling a spent flue gas denitration catalyst, the method comprising: physically removing solids deposited in the spent flue gas denitration catalyst; removing poisoning substances deposited in the spent flue gas denitration catalyst by washing the spent flue gas denitration catalyst with a washing liquid for a washing time determined by measuring the hydrogen ion concentration of the washing liquid; and drying the resulting spent flue gas denitration catalyst.

In the method of recycling the spent flue gas denitration catalyst, the washing time may be determined as a time when the hydrogen ion concentration of the washing liquid used in washing the spent flue gas denitration catalyst starts to become constant.

The step of physically removing solids deposited in the spent flue gas denitration catalyst may be carried out using a vacuum cleaner or blower.

The spent flue gas denitration catalyst may comprise one active material selected from the group consisting of vanadium (V), tungsten (W), barium (Ba), manganese (Mn), molybdenum (Mo) and an oxide thereof, or a mixture thereof. Here, the active material may be supported on a carrier, and the carrier may be a titanium dioxide carrier.

The spent flue gas denitration catalyst may have a honeycomb or plate shape.

The poisoning substances may include sulfur (S), phosphorus (P), an alkali metal, an alkali earth metal, or a heavy metal.

The washing liquid may comprise one selected from the group consisting of sulfuric acid, nitric acid, oxalic acid, formic acid and water, or a mixture thereof. The washing liquid may further comprise one selected from the group consisting of vanadium (V), tungsten (W), barium (Ba), manganese (Mn), molybdenum (Mo) and an oxide thereof, or a mixture thereof.

In accordance with another aspect of the present invention, there is provided a method of determining a washing time of a spent flue gas denitration catalyst, the method comprising determining the washing time for washing poisoning substances deposited in the spent flue gas denitration catalyst using a washing liquid, wherein the washing time is determined by measuring the hydrogen ion concentration of the washing liquid.

In the method of determining the washing time of the spent flue gas denitration catalyst, the washing time may be determined as a time when the hydrogen ion concentration of the washing liquid used in washing the spent flue gas denitration catalyst starts to become constant.

A better understanding of the above and many other features and advantages of the organic thin film transistor substrates and methods for making them disclosed herein may be

BRIEF DESCRIPTION OF THE DRAWINGS

The above and other features of the present invention will be described in reference to certain exemplary embodiments thereof with reference to the attached drawings in which.

DETAILED DESCRIPTION

Figure 1:
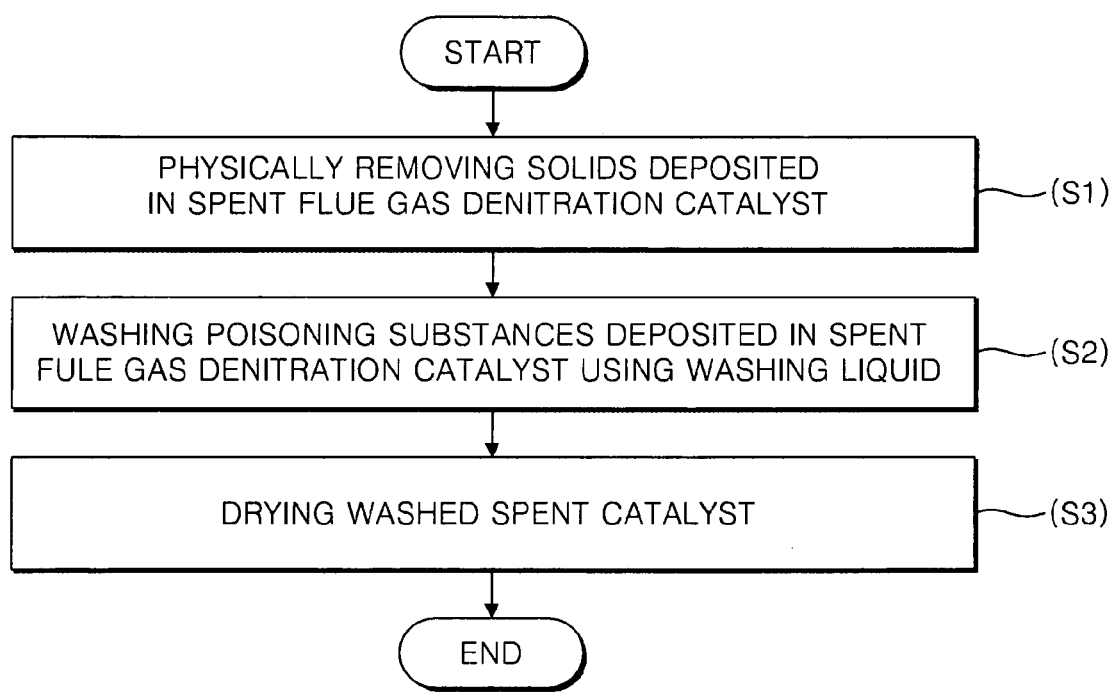
FIG. 1 is a flowchart illustrating a method of recycling a spent flue gas denitration catalyst in accordance with the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

A selective catalytic reduction (SCR) process is a technology that converts NOx into $N_2$ using a reducing agent such as $NH_3$, urea and hydrocarbon under the presence of a catalyst. The SCR process using $NH_3$ as the reducing agent is known as the most effective technology. The catalyst used in the SCR process includes one active material selected from the group consisting of vanadium (V), tungsten (W), barium (Ba), manganese (Mn), molybdenum (Mo), and an oxide thereof. In general, such a catalyst is supported on a carrier such as titanium dioxide ($TiO_2$). Typically, the catalyst has a honeycomb or plate shape so as to have a wider surface area.

When the catalyst is exposed to flue gas for a long time in the SCR process, the NOx conversion activity of the catalyst is reduced by the operational environment of the catalyst or by poisoning substances such as sulfur (S), phosphorus (P), alkali metals, alkali earth metals, or heavy metals contained in the flue gas.

The present invention provides a method of recycling the spent flue gas denitration catalyst, of which the activity has been lowered by the poisoning substances. FIG. 1 is a flowchart illustrating the method of recycling the spent flue gas denitration catalyst in accordance with the present invention. The method of recycling the spent flue gas denitration catalyst in accordance with the present invention will be described with respect to FIG. 1.

According to the method of recycling the spent flue gas denitration catalyst of the present invention, solids deposited in the spent catalyst are physically removed (S1).

The solids such as fly ash are deposited in the spent catalyst and such solids are removed by this step. A vacuum cleaner or blower may be used in this step.

Next, the poisoning substances deposited in the spent catalyst are washed and removed with a washing liquid (S2).

The washing liquid may include one selected from the group consisting of sulfuric acid, nitric acid, oxalic acid, formic acid, and water, or include a mixture thereof. However, the washing liquid is not limited to the above-described materials. The washing liquid may further include one active material selected from the group consisting of vanadium (V), tungsten (W), barium (Ba), manganese (Mn), molybdenum (Mo), and an oxide thereof or include a mixture thereof. Such materials are deposited in the spent catalyst during the washing process to improve the activity of the spent catalyst.

In this step, the time of the washing process should be optimized to leach out the catalyst poisoning substances as much as possible and to leach out the catalyst active materials as little as possible. For this purpose, the washing time should be determined by considering the leached amounts of the poisoning substances and the active materials according to the passage of time.

In the present invention, the washing time is determined by measuring the hydrogen ion concentration (pH) of the washing liquid. That is, an optimal washing time is determined by analyzing the change in the hydrogen ion concentration of the washing liquid used in the washing process of the spent catalyst.

Finally, the washed spent catalyst is dried (S3).

Figure 2:
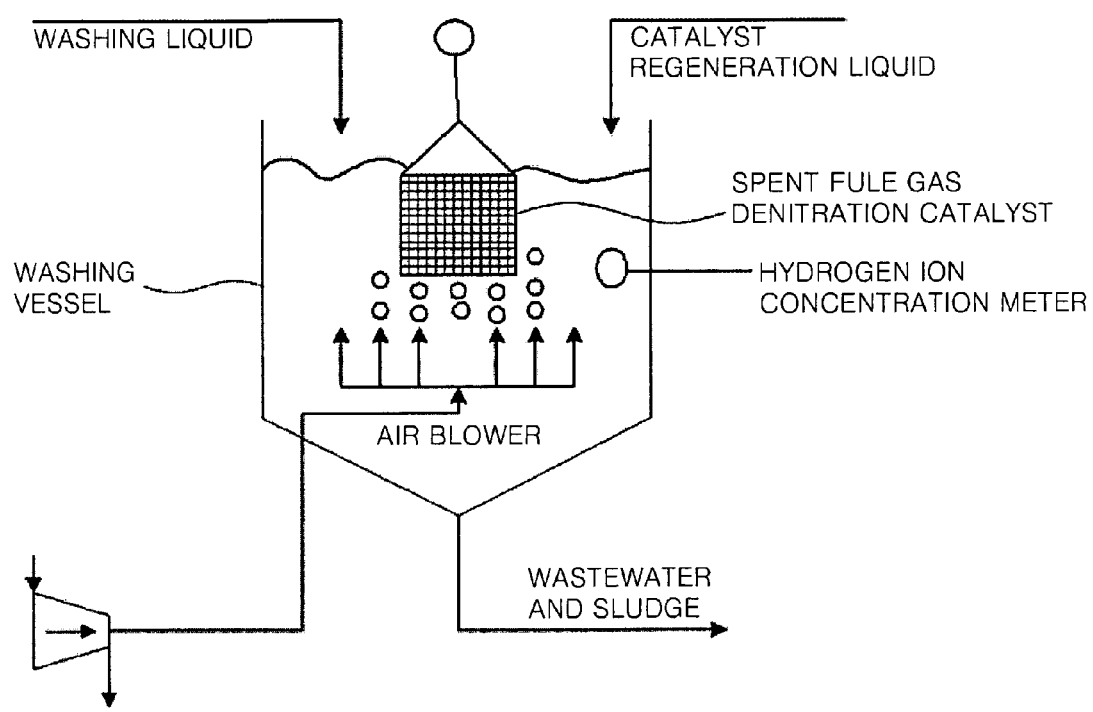
FIG. 2 is a diagram illustrating a method of determining a washing time of a spent flue gas denitration catalyst in accordance with the present invention.

FIG. 2 is a diagram illustrating the method of determining the washing time of the present invention. According to an ordinary method of washing the spent flue gas denitration catalyst, as shown in FIG. 2, the spent catalyst is positioned in a washing vessel and washed by supplying a washing liquid therein and discharging wastewater and sludge. Here, in order to facilitate the washing process, an air blower may be used. Moreover, in order to improve the activity of the spent catalyst, a catalyst regeneration liquid containing one selected from the group consisting of vanadium (V), tungsten (W), barium (Ba), manganese (Mn), molybdenum (Mo), and an oxide thereof may be used.

In the present invention, a hydrogen ion concentration meter is positioned in the washing vessel to measure the hydrogen ions of the washing liquid used in the washing process, thus determining the washing time. While passing through the washing process, the hydrogen ion concentration is rapidly reduced and then slowly reduced at a reduced rate of change. Accordingly, the washing time may be determined as the time when the reduction rate of the hydrogen ion concentration is reduced and thus the hydrogen ion concentration starts to become constant. The reason for this is that the poisoning substances are rarely deposited after that time and, rather, the performance of the spent catalyst may be degraded by the deposition of the active materials.

Here, the time when the hydrogen ion concentration starts to become constant does not mean the time when the reduction rate of the hydrogen ion concentration becomes "0" and thus there is no change in the hydrogen ion concentration, but means the time when the reduction rate of the hydrogen ion concentration is remarkably reduced and thus the change in the hydrogen ion concentration is negligible. That is, the above time is within a rational range that those of ordinary skill in the art can readily appreciate.

Next, the spent flue gas denitration catalyst washed with the washing liquid is dried.

In this step, the drying temperature may be in the range of 100 to 200° C. After the drying step, the resulting catalyst may be calcined at a temperature below 600° C., preferably, in the temperature range of 400 to 600° C. By passing through the calcining process, it is possible to improve the mechanical strength of the spent catalyst and remove foreign matters adhering to the spent catalyst.

Hereinafter, the present invention will be described in more detail with respect to Experimental Examples.

EXPERIMENTAL EXAMPLE 1

Change in Hydrogen Ion Concentration According to Washing Time

Figure 3:
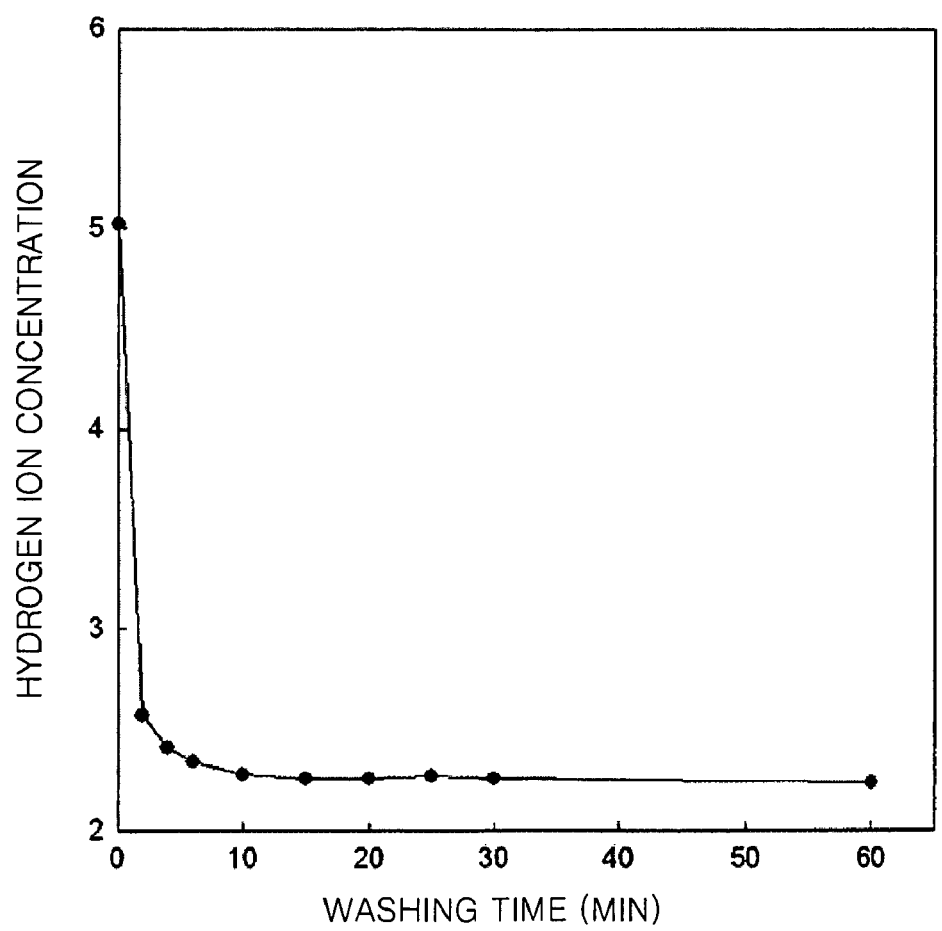
FIG. 3 is a graph showing a charge in the hydrogen ion concentration according to the washing time measured in Experimental Example 1.

The spent catalyst used in this Experimental Example was one that was used in flue gas denitration equipment of a thermal power plant for a long period of time such as 1,300 hours and had a denitrification efficiency lowered to about 58% at a temperature of 350° C. The above catalyst was a commercially available catalyst having a 20 cell-per-square-inch (CPSI) honeycomb structure and prepared by supporting $V_2O_5$ and $WO_3$ on a titanium dioxide carrier. The test catalyst was made into a granule having a size of 30 mm in length, 30 mm in width and 45 mm in height and immersed in distilled water of 1,000 ml so that the poisoning substances were eluted for 60 minutes. Here, the hydrogen ion concentrations with the passage of time were measured and shown in FIG. 3. It can be seen from FIG. 3 that the hydrogen ion concentration becomes nearly constant after 10 minutes.

EXPERIMENTAL EXAMPLE 2

Elution Amounts of Poisoning Substances According to Washing Time

Figure 4:
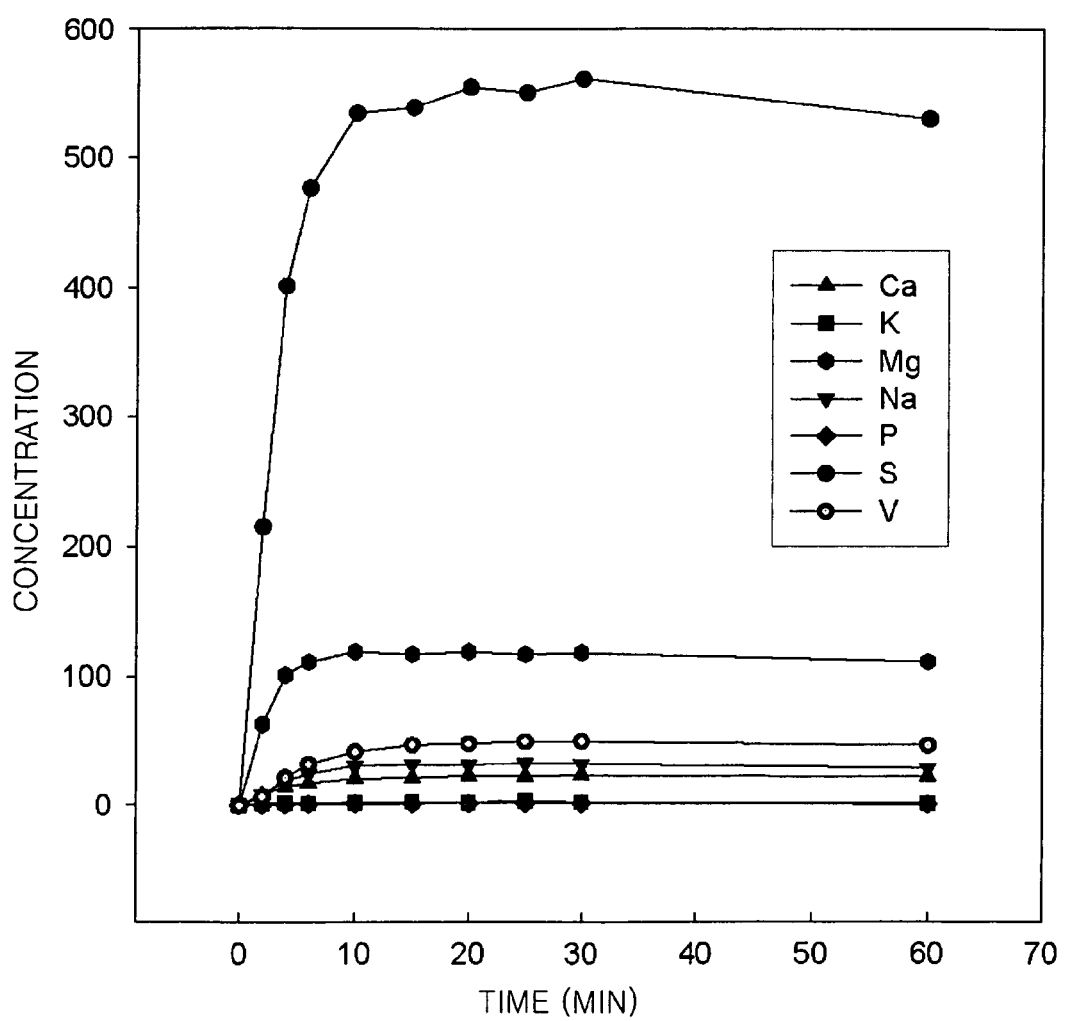
FIG. 4 is a graph showing changes in elution amounts of poisoning substances according to the washing time measured in Experimental Example 2.

The elution amounts of the poisoning substances such as Ca, K, Mg, Na, P, S and V according to the washing time in the catalyst and washing liquid, the same as those in Experimental Example 1, were analyzed using an inductively coupled plasma atomic emission spectrometer. FIG. 4 shows the elution amounts of the poisoning substances according to the washing time. It can be seen from FIG. 4 that the elution amounts of most poisoning substances become constant within about 10 minutes from the beginning of the washing process. These results are the same as those obtained from the measurement of the hydrogen ion concentrations according to the washing time. Accordingly, it can be understood that the time when the poisoning substrates are eluted, i.e., the washing time, can be calculated through the measurement of the hydrogen ion concentration in real time without using complicated equipment such as the inductively coupled plasma atomic emission spectrometer.

EXPERIMENTAL EXAMPLE 3

Denitrification Rates of Catalyst According to Washing Time

Under the same conditions as Experimental Examples 1 and 2, the denitrification rates of the catalyst were measured by varying the washing time. In this Experimental Example, the conditions for the measurement of the denitrification rates are shown in the following Table 1:

TABLE 1

| | |
|---|---|
| Reaction temperature | 400° C. |
| Space velocity | 20,000/hr |
| Molar ratio of ammonia/nitrogen oxide | 1.0 |
| Nitrogen oxide | 500 ppm |
| Sulfur oxide | 500 ppm |
| Oxygen | 5% |

The denitrification rates according to the washing time obtained from the above measurement are shown in the following Table 2. It can be understood from Table 2 that the regeneration efficiency of the catalyst is increased until 10 minutes in the washing process and then there is no change in the regeneration efficiency although the washing time is increased.

TABLE 2

| Washing time | Denitrification rate |
|---|---|
| 0 minutes | 58.0% |
| 4 minutes | 66.2% |
| 10 minutes | 78.3% |
| 20 minutes | 79.0% |
| 30 minutes | 78.5% |
| 60 minutes | 78.6% |

It can be understood from the results of Experimental Example 3 that the optimal washing time of the catalyst is 10 minutes. These results are the same as those obtained from the measurement of the hydrogen ion concentrations according to the washing time. Accordingly, it can be understood that the optimal washing time can be determined by the measurement of the hydrogen ion concentration without expensive equipment such as the inductively coupled plasma atomic emission spectrometer.

As described above, the selective catalytic reduction (SCR) process that uses ammonia as a reducing agent to remove nitrogen oxides generated from the thermal power plant or industrial boiler is most widely used and the use thereof has been increased. Moreover, since the catalyst used in the SCR equipment has a life span of 2 to 5 years and should be replaced with new one after a long time use, it is expected that the amount of the spent catalyst will be rapidly increased. Accordingly, if the spent catalyst classified as a specific waste is recycled, various positive effects in view of the environment as well as economic effects are expected.

In the present invention, it is possible to determine an optimal washing time by readily measuring the hydrogen ion concentration (pH) of the washing liquid used in the recycling process using a hydrogen ion concentration meter. Accordingly, the analysis time, manpower and cost can be reduced, and thus it is possible to determine the washing time economically, compared with the conventional methods for determining the washing time by quantitatively analyzing the poisoning substances in the washing liquid using expensive equipment such as the inductively coupled plasma atomic emission spectrometer. Especially, the present invention has an advantageous effect that the washing time can, be determined in real time in the field since the washing liquid is not analyzed in an analysis chamber having analysis equipment, but analyzed using the hydrogen ion concentration meter.

Although the present invention has been described with reference to certain exemplary embodiments thereof, it will be understood by those skilled in the art that a variety of modifications and variations may be made to the present invention without departing from the spirit or scope of the present invention defined in the appended claims, and their equivalents.

What is claimed is:

1. A method of recycling a spent flue gas denitration catalyst, the method comprising:
   physically removing solids deposited in the spent flue gas denitration catalyst;
   removing poisoning substances deposited in the spent flue gas denitration catalyst by washing the spent flue gas denitration catalyst with a washing liquid for a washing time determined as a time when the hydrogen ion concentration of the washing liquid used in washing the spent flue gas denitration catalyst starts to become constant at a pH range of above 2; and drying the resulting spent flue gas denitration catalyst in a temperature range of 100 to 200° C. and then calcining at a temperature range of 400 to 600° C.

2. The method of claim 1, wherein physically removing solids deposited in the spent flue gas denitration catalyst is carried out using a vacuum cleaner or blower.

3. The method of claim 1, wherein the spent flue gas denitration catalyst is used to remove nitrogen oxides.

4. The method of claim 1, wherein the spent flue gas denitration catalyst comprises one active material selected from the group consisting of vanadium (V), tungsten (W), barium (Ba), manganese (Mn), molybdenum (Mo) and an oxide thereof, or a mixture thereof.

5. The method of claim 4, wherein the active material is supported on a carrier.

6. The method of claim 5, wherein the carrier is a titanium dioxide carrier.

7. The method of claim 1, wherein the spent flue gas denitration catalyst has a honeycomb or plate shape.

8. The method of claim 1, wherein the poisoning substances include sulfur (S), phosphorus (P), an alkali metal, an alkali earth metal, or a heavy metal.

9. The method of claim 1, wherein the washing liquid comprises one selected from the group consisting of sulfuric acid, nitric acid, oxalic acid, formic acid and water, or a mixture thereof.

10. The method of claim 9, wherein the washing liquid further comprises one selected from the group consisting of vanadium (V), tungsten (W), barium (Ba), manganese (Mn), molybdenum (Mo) and an oxide thereof, or a mixture thereof.

* * * * *